United States Patent
Katayama (10) Patent No.: US 9,806,662 B2
(45) Date of Patent: Oct. 31, 2017

(54) MOTOR DRIVE CONTROLLER AND METHOD FOR CONTROLLING MOTOR

(71) Applicant: MINEBEA CO., LTD., Kitasaku-gun, Nagano (JP)

(72) Inventor: Keiichi Katayama, Yonago (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 15/227,183

(22) Filed: Aug. 3, 2016

(65) Prior Publication Data
US 2017/0040924 A1    Feb. 9, 2017

(30) Foreign Application Priority Data

Aug. 5, 2015  (JP) ................................ 2015-154854

(51) Int. Cl.
*H02P 23/00*    (2016.01)
*H02P 29/50*    (2016.01)
*H02P 6/10*     (2006.01)

(52) U.S. Cl.
CPC ............... *H02P 29/50* (2016.02); *H02P 6/10* (2013.01)

(58) Field of Classification Search
USPC ......... 318/400.01, 400.14, 400.15, 700, 701, 318/721, 779, 799, 430, 432, 437; 388/800, 819, 901; 363/40, 44, 120; 185/30
See application file for complete search history.

(56) References Cited

U.S. PATENT DOCUMENTS

| 4,914,361 A | * | 4/1990 | Tajima | ...................... H02P 6/06 318/400.04 |
| 5,175,479 A | * | 12/1992 | Tajima | ................. G05B 13/024 318/560 |

FOREIGN PATENT DOCUMENTS

JP          2012-141249 A       7/2012

* cited by examiner

*Primary Examiner* — Antony M Paul
(74) *Attorney, Agent, or Firm* — Carrier Blackman & Associates, P.C.; Joseph P. Carrier; Jingli Wang (57) ABSTRACT

A motor drive controller includes: a rotation status detector that detects a rotation status of a rotor of a motor and generates rotation status detection information corresponding to the detected rotation status; a rotation unevenness information generator that measures a rotation unevenness indicating a flutter characteristic of the motor based on the rotation status detection information and generates rotation unevenness information according to a result of measurement of the rotation unevenness; a control circuit that generates a driving control signal based on the rotation unevenness information and the target speed signal for controlling the motor to rotate in target speed corresponding to the target speed signal; and a motor driver that outputs a driving signal to the motor based on the driving control signal.

6 Claims, 7 Drawing Sheets

MOTOR DRIVE CONTROLLER AND METHOD FOR CONTROLLING MOTOR

BACKGROUND OF THE DISCLOSURE

1. Field of the Invention

The present invention relates to a motor drive controller and a method for controlling a motor and, more particularly, to a motor drive controller and a method for controlling a motor which measures rotation unevenness.

2. Description of the Related Art

In image forming devices such as a color copier, it is important to use a motor having less rotation unevenness (wow and flutter). This is because, when the rotation unevenness is present at the motor, there is a possibility of color unevenness occurring during printing.

In JP-A-2012-141249, there is disclosed a rotary electron beam printing device having a configuration in which a rotation speed servo control of a motor is performed depending on a rotation unevenness signal of the motor obtained by processing a read signal of a rotary encoder.

The device described in JP-A-2012-141249 is provided with the rotary encoder or a configuration for reading the rotary encoder, and a configuration such as a signal generator processing a read signal of the rotary encoder, and becomes large in scale.

SUMMARY OF THE INVENTION

One of objects of the present invention is to provide a motor drive controller capable of measuring a rotation unevenness value easily and performing rotation control with rotation unevenness reduced, and a method for controlling a motor.

According to an illustrative embodiment of the present invention, there is provided a motor drive controller including: a rotation status detector that detects a rotation status of a rotor of a motor and generates rotation status detection information corresponding to the detected rotation status; a rotation unevenness information generator that measures a rotation unevenness indicating a flutter characteristic of the motor based on the rotation status detection information and generates rotation unevenness information according to a result of measurement of the rotation unevenness; a control circuit that generates a driving control signal based on the rotation unevenness information and the target speed signal for controlling the motor to rotate in target speed corresponding to the target speed signal; and a motor driver that outputs a driving signal to the motor based on the driving control signal.

According to another illustrative embodiment of the present invention, there is provided a method for controlling a motor, the method including: detecting a rotation status of a rotor of the motor; generating rotation status detection information corresponding to the detected rotation status; measuring a rotation unevenness indicating a flutter characteristic of the motor based on the rotation status detection information; generating rotation unevenness information according to a result of measurement of the rotation unevenness; generating a driving control signal based on the rotation unevenness information and the target speed signal for controlling the motor to rotate in target speed corresponding to the target speed signal; and outputting a driving signal to the motor based on the driving control signal.

DETAILED DESCRIPTION

Hereinafter, electronic equipment using a motor drive controller in one embodiment of the invention will be described.

Figure 1:
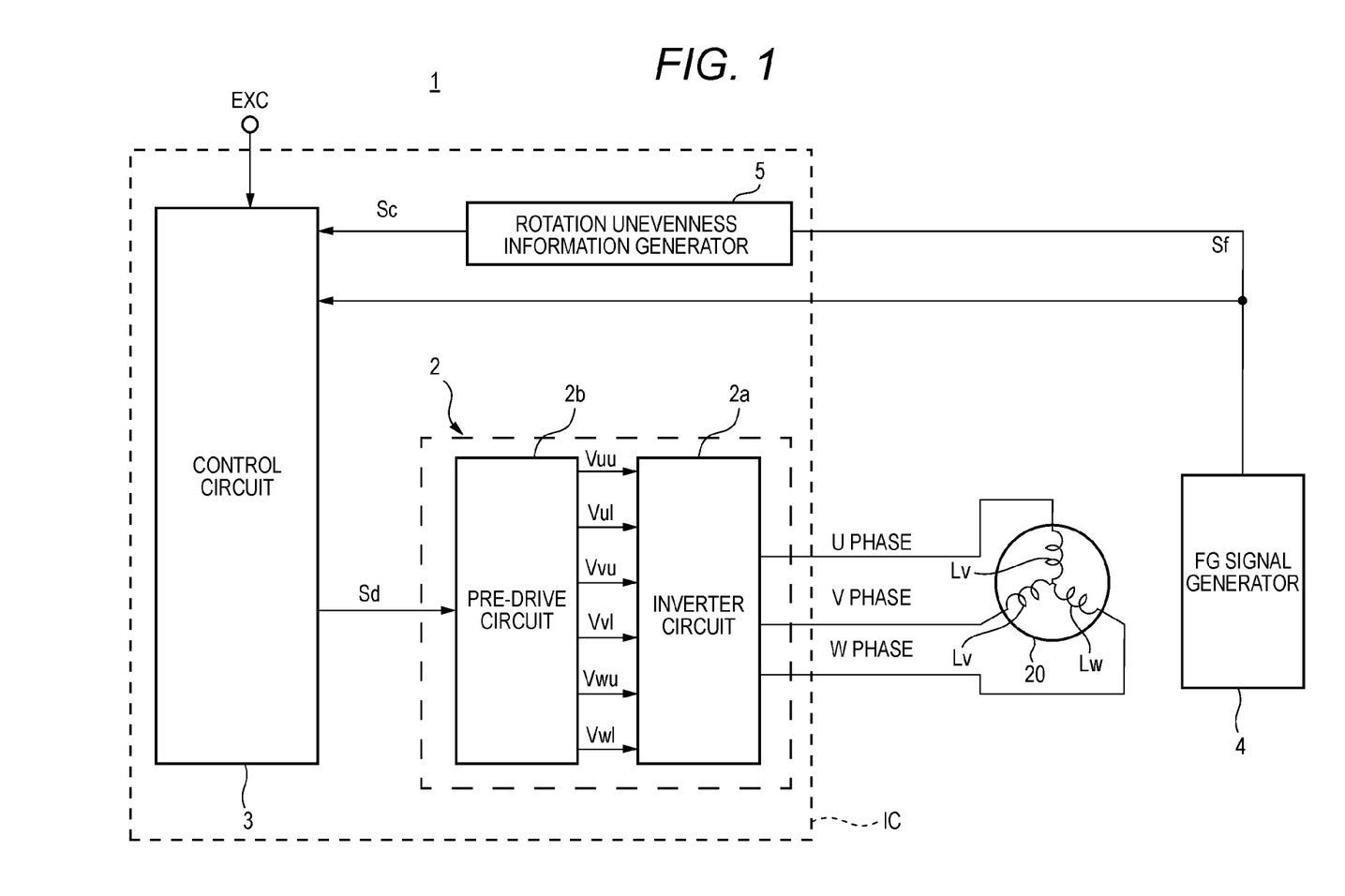
FIG. 1 is a block diagram illustrating an outline of a circuit configuration of a motor drive controller according to an embodiment of the invention.

FIG. 1 is a block diagram illustrating an outline of a circuit configuration of a motor drive controller according to an embodiment of the invention.

As illustrated in FIG. 1, a motor drive controller 1 is configured such that a brushless motor 20 (hereinafter referred to simply as a motor 20) is driven by, for instance, sine wave drive. In the present embodiment, the motor 20 is, for instance, a three-phase brushless motor. The motor drive controller 1 rotates the motor 20 by outputting a sine wave drive signal to the motor 20 to apply a sine wave drive current to armature coils Lu, Lv, and Lw of the motor 20 by periods.

The motor drive controller 1 has a motor driver 2 having an inverter circuit 2a and a pre-drive circuit 2b, a control circuit 3, an FG signal generator (an example of a rotation status detector) 4, and a rotation unevenness information generator 5. Components illustrated in FIG. 1 are a part of the entire motor drive controller 1. The motor drive controller 1 may have other components in addition to the components illustrated in FIG. 1.

In the present embodiment, the motor drive controller 1 is an integrated circuit (IC) device in which the motor driver 2, the control circuit 3, and the rotation unevenness information generator 5 are integrated and packaged. A part of the motor drive controller 1 may be packaged as one integrated circuit device, or the whole or part of the motor drive controller 1 may be packaged along with another device and be configured as one integrated circuit device.

The inverter circuit 2a constitutes the motor driver 2 along with the pre-drive circuit 2b. The inverter circuit 2a outputs a driving signal to the motor 20 based on an output signal that is output from the pre-drive circuit 2b, and applies a current to the armature coils Lu, Lv, and Lw provided with the motor 20. The inverter circuit 2a is, for instance, configured such that series circuit pairs of two switch elements provided at opposite ends of a direct current (DC) power supply Vcc are disposed for respective phases (U, V, and W phases) of the armature coils Lu, Lv, and Lw. With respect to each pair of the two switch elements, a terminal of each phase of the motor 20 is connected to a connecting point of the switch elements.

The pre-drive circuit 2b generates output signals for driving the inverter circuit 2a based on control of the control circuit 3, and outputs the output signals to the inverter circuit 2a. The pre-drive circuit 2b generates the output signals based on a driving control signal Sd. As the output signals, for example, six types of Vuu, Vul, Vvu, Vvl, Vwu, and Vwl corresponding to each switch element of the inverter circuit 2a are output. As these output signals are output, the switch elements corresponding to the respective output signals turn on and off, a driving signal is output to the motor 20, and power is supplied to each phase of the motor 20.

In the present embodiment, the control circuit 3 outputs the driving control signal Sd for driving the motor 20 to the motor driver 2 and controls the motor driver 2, thereby performing driving control of the motor 20.

The FG signal generator 4 detects an FG signal (an example of rotation status detection information) Sf, and outputs the FG signal Sf to the control circuit 3 and the rotation unevenness information generator 5. The FG signal Sf is input to the control circuit 3 as rotation speed information corresponding to a rotation speed of the motor 20, and is input to the rotation unevenness information generator 5 as rotation status detection information for measuring the rotation unevenness of the motor 20.

That is, the FG signal Sf acting as the rotation speed information is rotation speed information in units of cycle. As will be described below, the control circuit 3 detects a speed error of the motor 20 based on this information and a target speed signal EXC, and carries out speed control of the motor 20.

On the other hand, the FG signal Sf acting as the rotation status detection information is information indicating each rotation status of the motor 20. As this information is calculated at the rotation unevenness information generator 5, the rotation unevenness of the motor 20 is measured.

In place of the FG signal Sf or along with the FG signal Sf, another detected signal may be configured to be used as the rotation speed information or the rotation status detection information. Another detected signal may include, for instance, a signal that can be generated using a hall sensor (a hall element or a hall IC).

Figure 2:
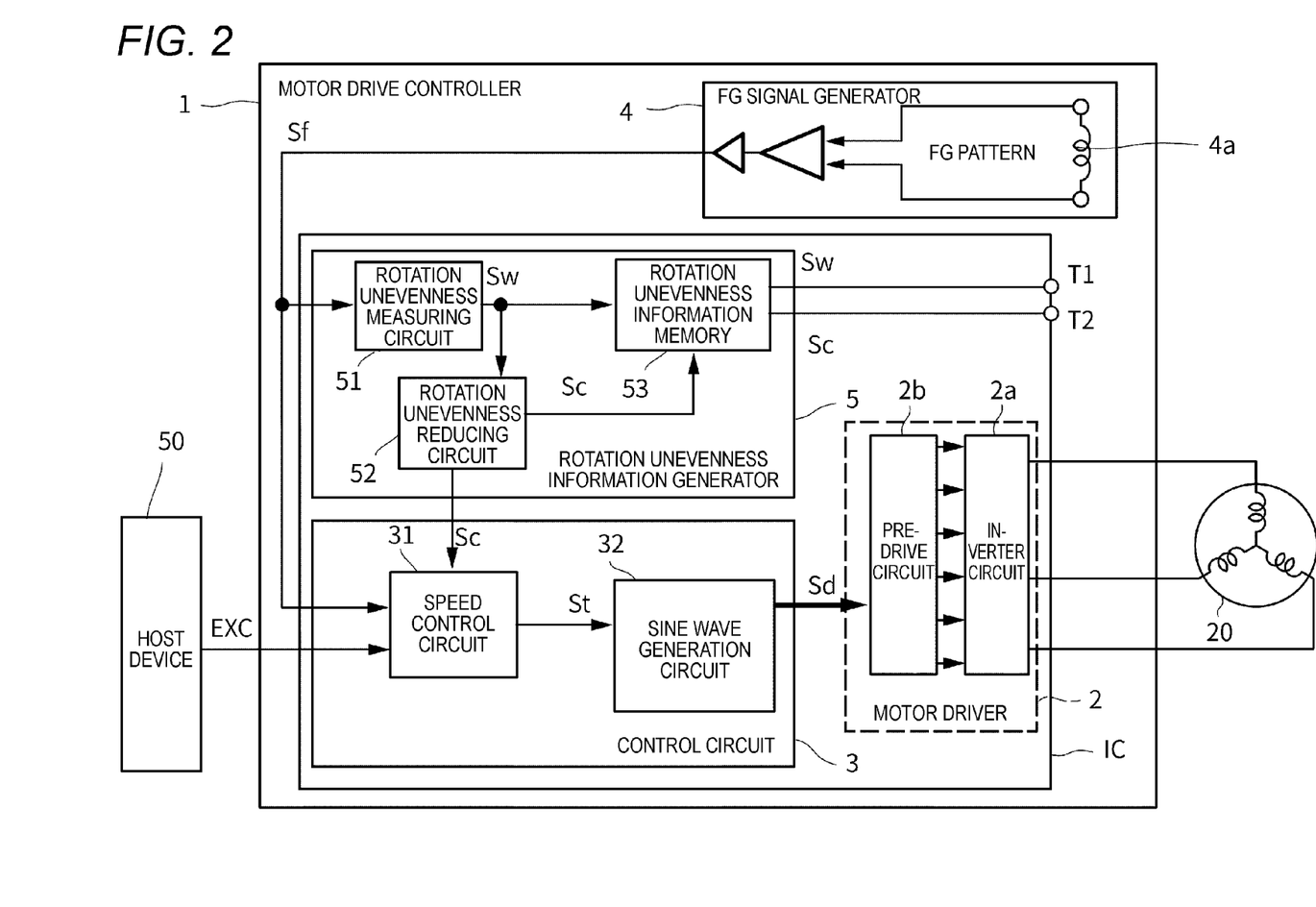
FIG. 2 is a diagram illustrating the circuit configuration of the motor drive controller according to the present embodiment.

FIG. 2 is a diagram illustrating a circuit configuration of the motor drive controller 1 according to the present embodiment.

The FG signal Sf, the target speed signal EXC and rotation unevenness control information (an example of information based on rotation unevenness information) Sc are input to the control circuit 3. The control circuit 3 outputs the driving control signal Sd to the pre-drive circuit 2b based on the FG signal Sf, the target speed signal EXC and the rotation unevenness control information Sc. The control circuit 3 outputs the driving control signal Sd to the motor driver 2 such that the motor 20 follows the target speed corresponding to the target speed signal EXC, thereby performing the rotation control of the motor 20. The motor driver 2 outputs a sine wave drive signal to the motor 20 based on the driving control signal Sd, and drives the motor 20.

The target speed signal EXC is, for instance, a clock signal output from a clock terminal of a host device 50. The target speed signal EXC is a periodic signal corresponding to the target rotation speed of the motor 20. In other words, the target speed signal EXC is information corresponding to a target value (a target speed) of the rotation speed of the motor 20, where the target value is intended to indicate at what Hz (rpm) the motor 20 is rotated.

The FG signal Sf is rotation speed information that is generated by the FG signal generator 4 and corresponds to the number of revolutions of a rotor. In the present embodiment, a FG pattern 4a that is a coil pattern for generating the FG signal Sf is formed on a board that is located at a rotor side of the motor 20. The FG signal generator 4 generates the FG signal Sf according to an induced voltage of the FG pattern 4a.

For example, a start/stop signal, a braking signal or a rotational direction setting signal is input to the control circuit 3 from the host device 50, but illustration of these signals is omitted.

The control circuit 3 includes a speed control circuit 31 and a sine wave generation circuit 32.

The target speed signal EXC, the FG signal Sf acting as the rotation speed information, and the rotation unevenness control information Sc are input to the speed control circuit 31. The speed control circuit 31 generates a torque instruction signal St controlling the motor 20 to follow the target speed depending on a result of comparing the target speed signal EXC and the FG signal Sf. To be specific, for example, if a clock signal of 1000 Hz is input as the target speed signal EXC, the speed control circuit 31 adjusts the rotor such that the rotor is rotated at 1000 Hz. When the input FG signal Sf is, for instance, 1005 Hz (a rotation speed of the rotor), and when the target speed signal EXC is 1000 Hz, a torque instruction is adjusted based on a difference (5 Hz in this example) of the rotation speed (feedback control), and the rotation speed is controlled.

The torque instruction signal St is input to the sine wave generation circuit 32. The sine wave generation circuit 32 generates the driving control signal Sd based on the torque instruction signal St, and outputs the driving control signal Sd to the motor driver 2. Thereby, the motor 20 is driven to be rotated by a torque instruction value corresponding to the torque instruction signal St.

The rotation unevenness information generator 5 is provided with a rotation unevenness measuring circuit 51, a rotation unevenness reducing circuit 52, and a rotation unevenness information memory 53. The rotation unevenness information generator 5 generates rotation unevenness information based on the rotation status detection information (equivalent to a step (to be described below) of generating the rotation unevenness information).

The FG signal Sf acting as the rotation status detection information is input to the rotation unevenness measuring circuit 51. The rotation unevenness measuring circuit 51 performs calculation on the FG signal Sf, thereby measuring rotation unevenness (expressed in the unit of percentage) showing a flutter characteristic of the motor 20 which is different from a speed error or a rate of change in speed. The rotation unevenness measuring circuit 51 outputs a rotation unevenness measured value (an example of the rotation unevenness information) Sw that is a result of measuring the rotation unevenness. The rotation unevenness measured value Sw is input to the rotation unevenness reducing circuit 52 and the rotation unevenness information memory 53.

The rotation unevenness reducing circuit 52 generates rotation unevenness control information Sc including optimized gain/advance angle information for reducing the rotation unevenness based on the rotation unevenness measured value Sw. The rotation unevenness control information Sc is input to the rotation unevenness information memory 53 and the speed control circuit 31 of the control circuit 3.

The rotation unevenness information memory 53 is a memory. The rotation unevenness information memory 53 stores the input rotation unevenness measured value Sw and the input rotation unevenness control information Sc (a constant of an optimum gain/advance angle). The rotation unevenness information memory 53 may be configured to store any one of the rotation unevenness measured value Sw and the rotation unevenness control information Sc. As the rotation unevenness information memory 53, a memory used to store the gain information or the advance angle information in the related art may be used.

In the present embodiment, the rotation unevenness measured value Sw and the rotation unevenness control information Sc, both of which are stored in the rotation unevenness information memory 53 can be output to the outside as needed. The rotation unevenness measured value Sw is output from an output terminal T1, and the rotation unevenness control information Sc is output from an output terminal T2.

When the rotation unevenness control information Sc is input from the rotation unevenness information generator 5, the control circuit 3 makes it possible to include the rotation unevenness control information Sc in the driving control signal Sd based on the rotation unevenness control information Sc as needed (equivalent to a driving signal generating step). Thereby, the driving of the motor 20 is controlled by the control circuit 3 such that the rotation unevenness of the motor 20 is reduced depending on an operation of the rotation unevenness information generator 5. In other words, the motor driver 2 drives the motor 20 such that the rotation unevenness of the motor 20 is reduced based on the driving control signal Sd (equivalent to a motor driving step).

Figure 3:
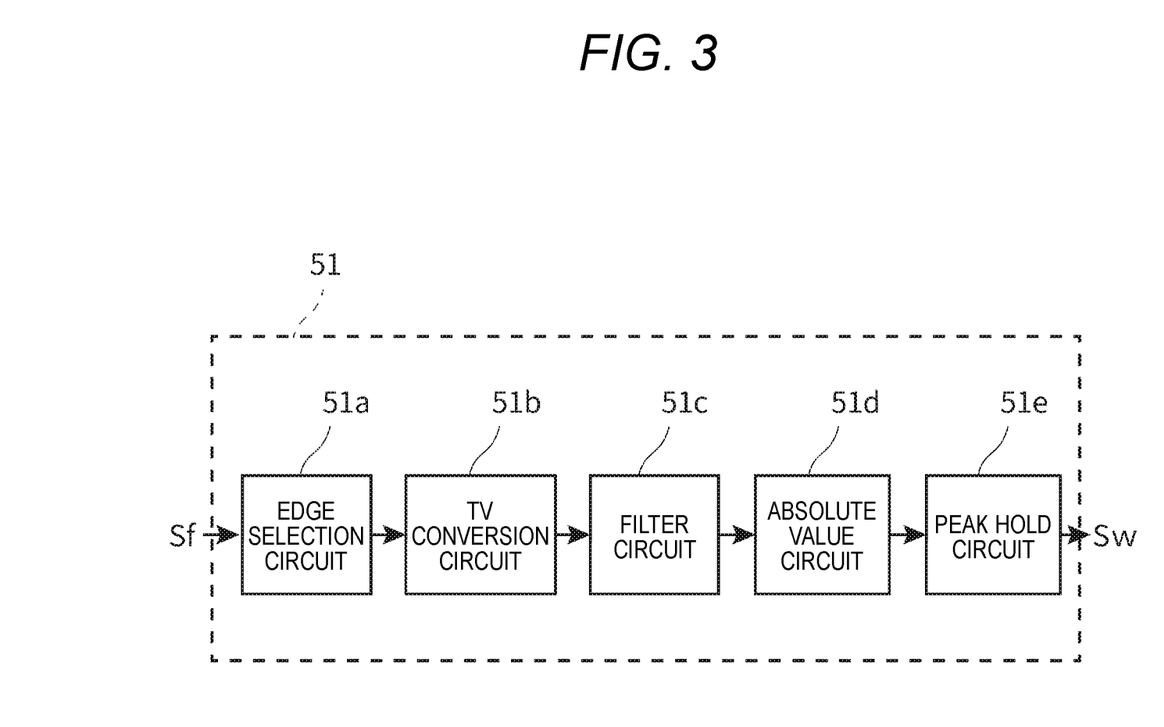
FIG. 3 is a block diagram illustrating an example of a configuration of a rotation unevenness measuring circuit.

FIG. 3 is a block diagram illustrating an example of a configuration of the rotation unevenness measuring circuit S1.

As illustrated in FIG. 3, the FG signal Sf is input to an edge selection circuit 51*a*. The edge selection circuit 51*a* selects rising and falling edges of the FG signal Sf that is a pulse signal. Based on a result of processing this, a TV conversion circuit 51*b* converts a time of a pulse width of the FG signal Sf into a voltage. A result of the conversion is input to an absolute value circuit 51*d* through a high-pass filter, a low-pass filter, and a CR filter included in a filter circuit 51*c*. The absolute value circuit 51*d* converts a minus value of the voltage into a plus value and outputs the converted value. A peak hold circuit 51*e* holds and outputs a peak value.

In this way, the rotation unevenness measuring circuit 51 does not detect a speed error or a rate of change in speed of the motor, but generates the rotation unevenness measured value Sw representing the actual rotation unevenness itself using the FG signal Sf. The generated rotation unevenness measured value Sw is output from the rotation unevenness measuring circuit 51.

The rotation unevenness measuring circuit 51 may be configured using any of hardware and software. In the case of a hardware circuit, the rotation unevenness measuring circuit 51 can be configured of an analog circuit. However, in the case of the integrated circuit as in the present embodiment, the rotation unevenness measuring circuit 51 is configured of a logic circuit.

When the filter circuit 51*c* is configured of a logic circuit, there is a need to make great use of a multiplier circuit having a great gate scale. For this reason, calculation such as multiplication is preferably designed to perform software-based processing using a microcomputer.

For example, as a function of a wow flutter meter that is generally used to evaluate the rotation unevenness of the motor is mounted on an integrated circuit, the rotation unevenness measuring circuit 51 may be configured. A method of measuring the rotation unevenness is not limited to the above measuring method described using FIG. 3, and may adopt various methods.

Figure 4:
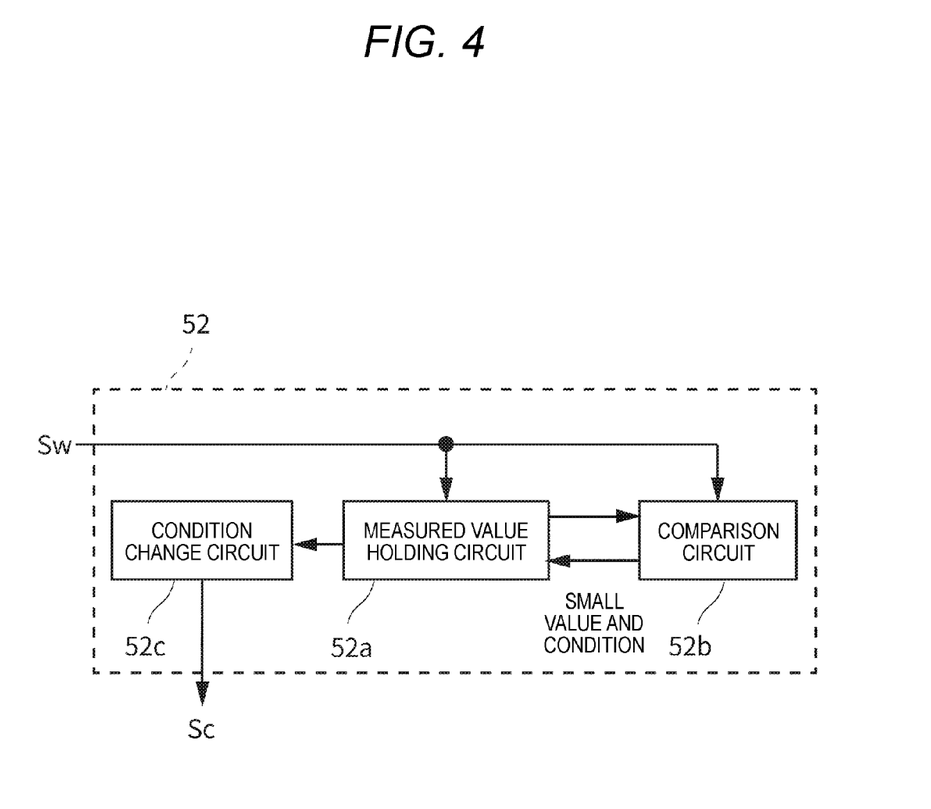
FIG. 4 is a block diagram illustrating an example of a configuration of a rotation unevenness reducing circuit.
Figure 5:
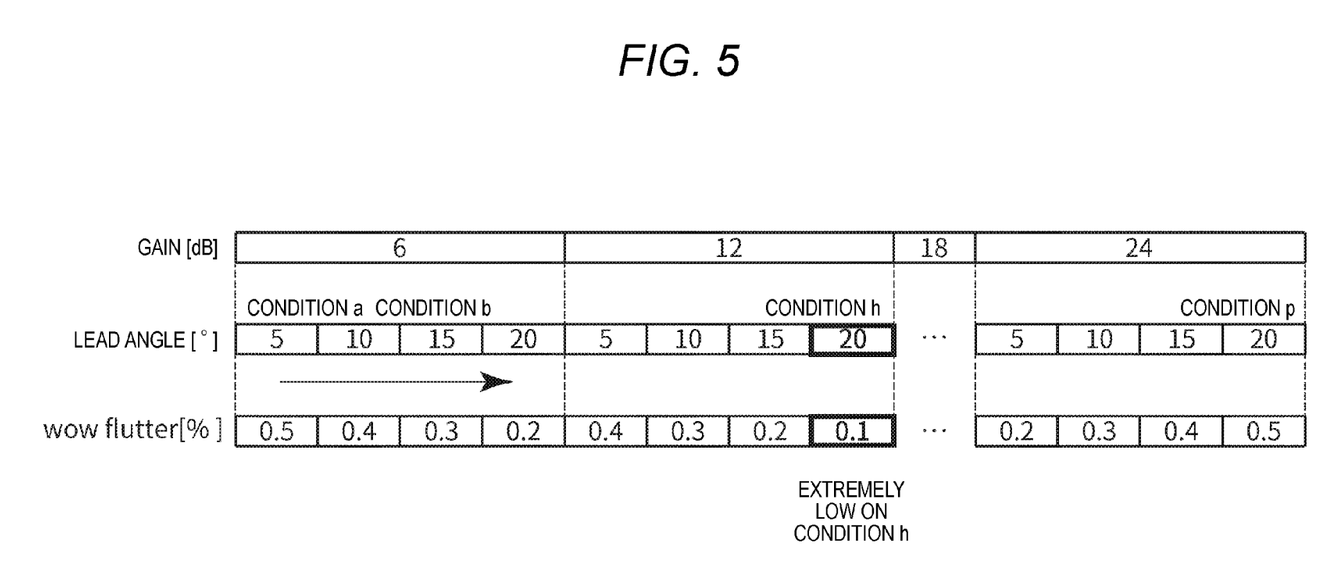
FIG. 5 is a timing chart illustrating optimization of gain information and advance angle information.

FIG. 4 is a block diagram illustrating an example of a configuration of the rotation unevenness reducing circuit 52. FIG. 5 is a timing chart illustrating optimization of gain information and advance angle information.

As illustrated in FIG. 4, the rotation unevenness reducing circuit 52 is provided with a measured value holding circuit 52*a*, a comparison circuit 52*b*, and a condition change circuit 52*c*. The rotation unevenness reducing circuit 52 changes conditions for the gain information and the advance angle information, selects a combination of the gain information and the advance angle information in order to extremely reduce the rotation unevenness, and outputs the rotation unevenness control information Sc including this information. This operation may be performed by any configuration of hardware and software.

First, the condition change circuit 52*c* changes the rotation unevenness control information Sc. That is, the gain information and the advance angle information are changed. Here, for example, a condition "a" illustrated in FIG. 5 is set. In the condition "a", a gain is 6 dB, and an advance angle is 5 degrees.

When the motor 20 is driven, then a rotation unevenness measured value Sw is input from the rotation unevenness measuring circuit 51. Here, it is assumed that the rotation unevenness measured value Sw having a wow flutter of 0.5% is input. Then, the rotation unevenness reducing circuit 52 operates as follows.

The measured value holding circuit 52*a* holds the rotation unevenness measured value Sw.

The condition change circuit 52*c* changes the rotation unevenness control information Sc from the condition a to a condition "b". In the condition b, a gain is 6 dB, and an advance angle is 10 degrees. Then, a wow flutter becomes 0.4%.

The rotation unevenness measured value Sw is input to the comparison circuit 52*b*.

The comparison circuit 52*b* compares the input rotation unevenness measured value Sw and the rotation unevenness measured value Sw held by the measured value holding circuit 52*a*. As a result of the comparison, the smaller rotation unevenness measured value Sw is held by the measured value holding circuit 52*a*, and the condition change circuit 52*c* changes the rotation unevenness control information Sc as needed so as to become the condition at that moment. That is, when the rotation unevenness control information Sc is changed from the condition "a" to the condition "b" and the wow flutter is changed from 0.5% to 0.4%, the smaller wow flutter, 0.4%, is held, and the rotation unevenness control information Sc having the condition "b" is output.

This change in condition and this comparison between the rotation unevenness measured values Sw are repeated with respect to all conditions (conditions "a" to "p") prepared as illustrated in FIG. 5. That is, in the case of each of the conditions "a" to "p", a rotation unevenness measured value Sw, namely a value of the wow flutter, is found.

In the example illustrated in FIG. 5, under a condition "h" (a gain is 12 dB, and an advance angle is 20 degrees), the wow flutter becomes a minimum (0.1%). This condition is determined and held as optimum gain information and optimum advance angle information, both of which are optimized and in which the rotation unevenness is extremely reduced. Thereby, the rotation unevenness control information Sc including the optimum gain information and the optimum advance angle information is output.

Figure 6:
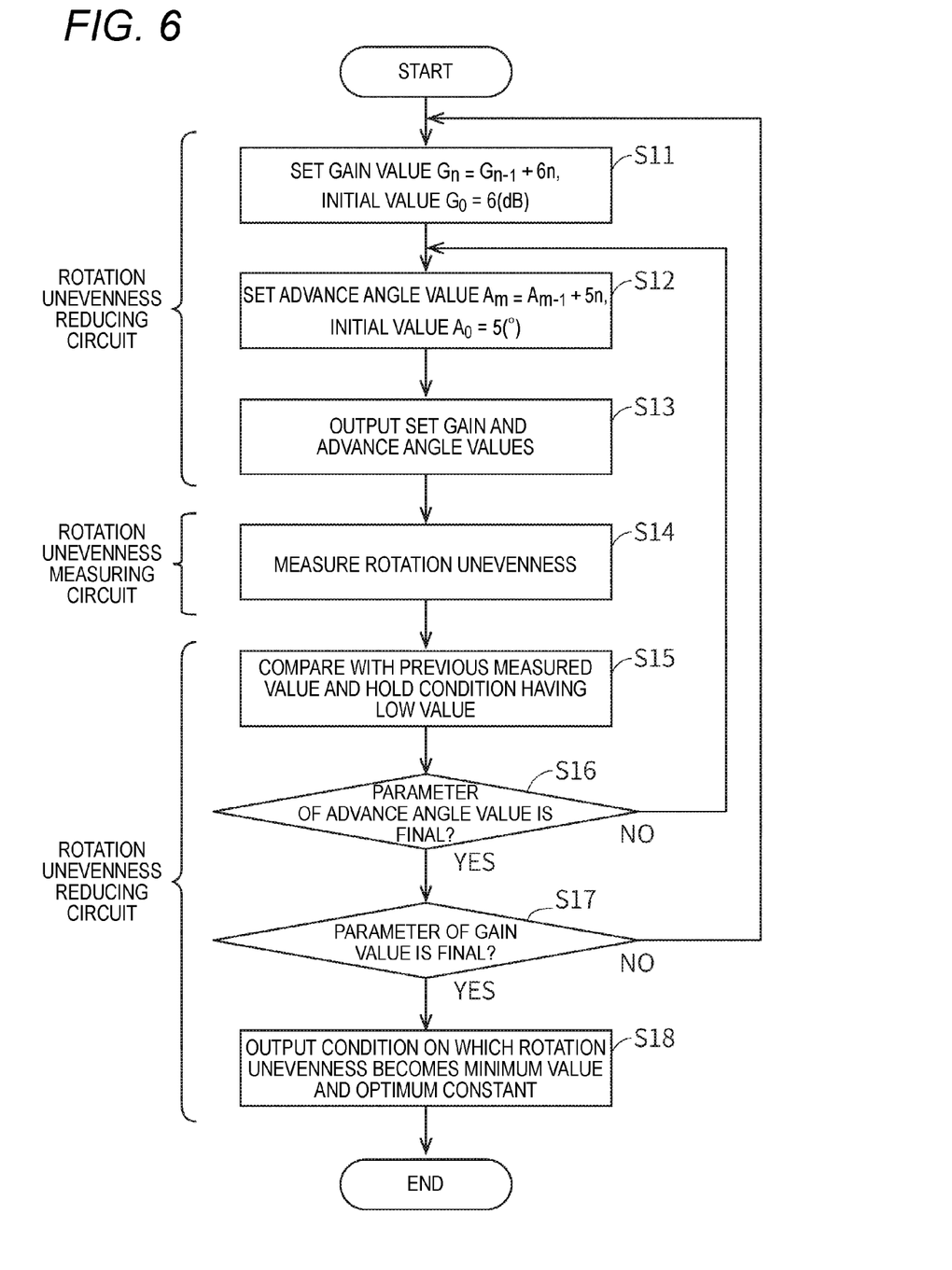
FIG. 6 is a flowchart illustrating an operation related to the optimization of the gain information and the advance angle information at a rotation unevenness information generator.

An operation related to this optimization of the gain information and the advance angle information will be described as an operation performed at the rotation unevenness information generator 5 with reference to a flowchart as follows.

FIG. 6 is a flowchart illustrating an operation related to optimization of gain information and advance angle information at the rotation unevenness information generator 5.

In the motor drive controller 1, for example, a process illustrated in FIG. 6 is performed as a rotation unevenness information generating step at the rotation unevenness information generator 5, and thereby optimization of a gain and an advance angle can be automatically performed.

Processes from step S11 to step S13 and processes from step S15 to step S18 are performed at the rotation unevenness reducing circuit 52. A process of step S14 is performed at the rotation unevenness measuring circuit 51.

Here, it is, for example, assumed that a target speed signal is 1000 Hz, adoptable values of gain information (a gain value) are 6 dB, 12 dB, 18 dB, and 24 dB, and adoptable value of advance angle information (an advance angle value) are 5 degrees, 10 degrees, 15 degrees, and 20 degrees.

As illustrated in FIG. 6, a gain value is set in step S11. The gain value has an initial value G0 of 6 dB, and then is increased by 6 dB whenever n is increased by 1.

An advance angle value is set in step S12. The advance angle value has an initial value A0 of 5 degrees, and then is increased by 5 degrees whenever m is increased by 1.

In step S13, the condition change circuit 52c outputs the set gain value and the set advance angle value as the rotation unevenness control information Sc. The driving of the motor 20 is controlled at the control circuit 3 based on this rotation unevenness control information Sc.

In step S14, rotation unevenness is measured at the rotation unevenness measuring circuit 51. The rotation unevenness measured value Sw is output from the rotation unevenness measuring circuit 51.

In step S15, the comparison circuit 52b and the measured value holding circuit 52a compares the previous rotation unevenness measured value Sw and the currently output rotation unevenness measured value Sw, and holds a condition having the smaller value.

In step S16, the condition change circuit 52c determines whether or not the advance angle value reaches a predetermined final value (20 degrees in this example). When the advance angle value is not the final value, the process returns to step S12, and the processes of step S13 to step S15 are performed by changing the advance angle value only.

When the advance angle value is the final value in step S16, it is determined in step S17 whether or not the gain value reaches a predetermined final value (24 dB in this example). When the gain value is not the final value, the process returns to step S11, and the processes of step S13 to step S15 are performed on each advance angle value after the gain value is changed.

When the gain value is the final value in step S17, a condition on which the rotation unevenness becomes a least value is determined in step S18. That is, the condition held at that point in time becomes an optimum gain value and an optimum advance angle value. The condition change circuit 52c outputs the rotation unevenness control information Sc including the gain value and the advance angle value of the optimized condition. Thereby, the driving control of the motor 20 is performed by the control circuit 3 based on the optimized rotation unevenness control information Sc.

A variation width of the rotation unevenness control information Sc changed for optimization is not limited to the foregoing. As the rotation unevenness control information Sc is adapted to be changed and optimized with a wide width, it is possible to increase a width of use conditions of the motor 20 and perform control of reducing the rotation unevenness of the motor 20 in wide application.

Figure 7:
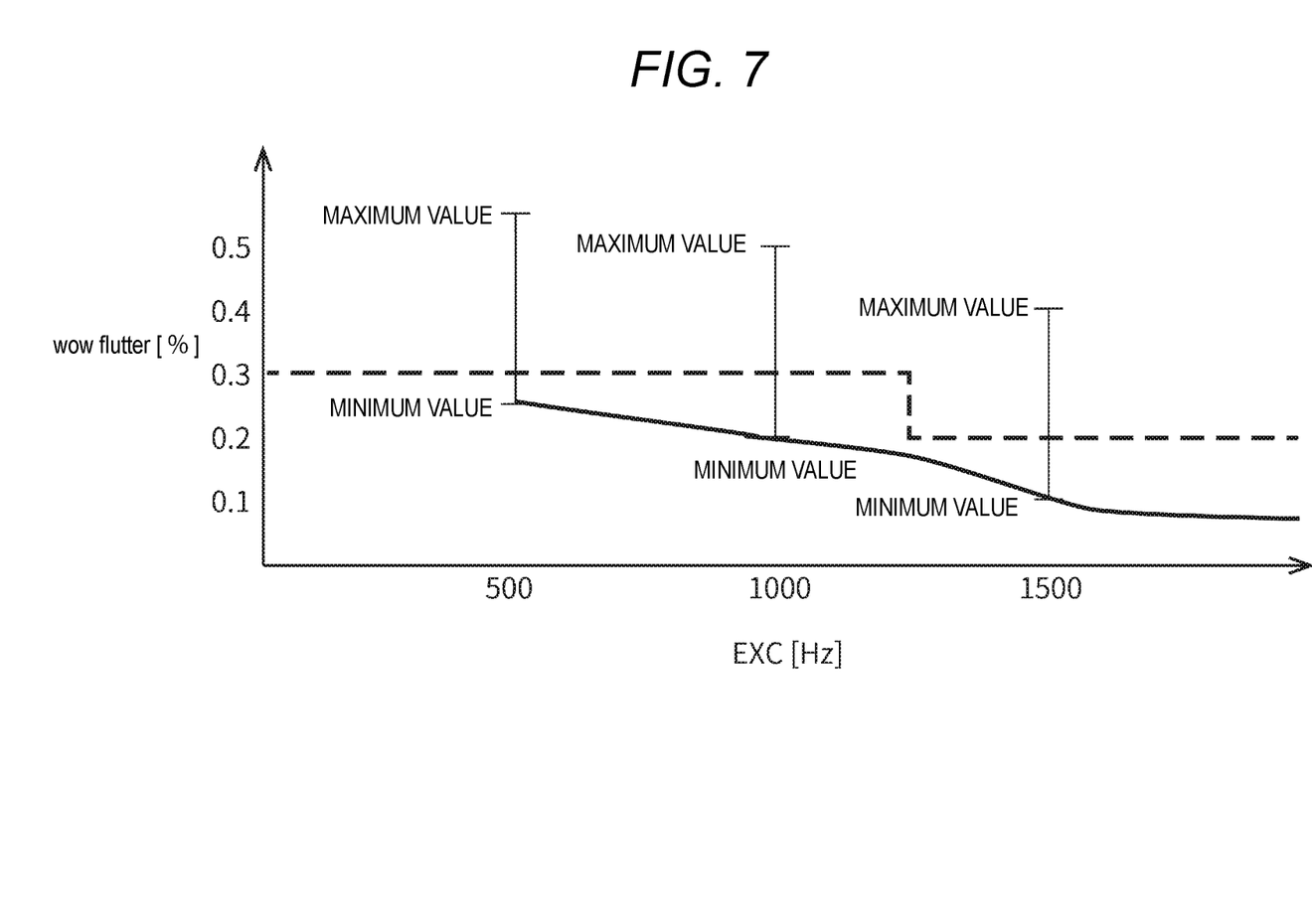
FIG. 7 is a diagram illustrating a specific example of a result of reducing rotation unevenness by the motor drive controller.

FIG. 7 is a diagram illustrating a specific example of a result of reducing the rotation unevenness by the motor drive controller 1.

FIG. 7 is a diagram illustrating a transition (a solid line) of the wow flutter at each target speed signal EXC when the target speed signal EXC varies to not less than 500 Hz. A broken line in FIG. 7 indicates an example of an upper limit of the allowed wow flutter. A minimum value and a maximum value are values indicating a width of the rotation speed with which the wow flutter varies when the gain information and the advance angle information are changed.

As illustrated in FIG. 7, in the present embodiment, as described above, the gain information and the advance angle information are optimized such that the rotation unevenness representing the flutter characteristic is minimized, and the control circuit 3 controls the driving of the motor 20 based on the optimized gain information and the optimized advance angle information. Therefore, the motor 20 is driven with the wow flutter minimized constantly in any speed range.

As described above, in the present embodiment, since the function of measuring the rotation unevenness is incorporated in the motor drive controller 1, the rotation unevenness can be easily measured under any use environment without requiring a dedicated rotation unevenness meter. The rotation control of the motor 20 can be performed with the rotation unevenness reduced.

Up to now, a motor designer needed to optimize the gain information and the advance angle information to meet a standard (for instance, "the wow flutter is not more than 0.20%") required for the rotation unevenness. In the motor drive controller 1, the optimization of the gain information and the advance angle information for reducing the rotation unevenness can be automatically processed. That is, the motor drive controller 1 itself takes charge of a human work process that has been performed by the motor designer up to now and is heavy in burden related to the optimization. The motor designer can automatically perform the optimization of the gain/advance angle for the motor 20 only by driving the motor 20 in a required use environment of the motor 20. Therefore, the man-hours required for setting work of the motor designer can be remarkably reduced. As a result, the motor 20 having small rotation unevenness can be easily provided according to use conditions such as a device for which the motor 20 is used and the number of revolutions thereof.

Depending on a type of the mass-produced motor 20, the optimized gain information and the optimized advance angle information are allowed to be output, and thereby the width of the use conditions can be widened.

Even the same model of motor 20 is used under various conditions such as an environment in which a rotational speed is slow and a load is high, an environment in which a rotational speed is fast and a load is low, and so on. If the motor drive controller 1 of the invention is used, the motor can be automatically optimized such that the rotation unevenness is reduced corresponding to each condition. For this reason, the motor 20 can be used in a wide situation by preparing one type of motor 20 and the motor drive controller 1. Therefore, production management or inventory management of the motor 20 is easily carried out.

After consignment of the motor, the gain information or the advance angle information is automatically optimized even under an environment which a user uses. Therefore, even if there is a change in device or purpose for which the motor is used, a change in use conditions, and so on, no labor for resetting the gain information and the advance angle information is required.

The rotation unevenness information generator 5 is configured of the logic circuit along with another circuit or is configured to perform software processing and so on, thereby being integrated. Therefore, the motor drive controller 1 can be made small, light, or inexpensive.

If necessary, the rotation unevenness measured value Sw may be allowed to be output to the outside of the motor drive controller 1 with no change. If necessary, the rotation unevenness control information Sc may be allowed to be output to the outside of the motor drive controller 1 with no change. At this point, an output method may be numerical display, parallel or serial output of a digital value, or output of an analog value. Thus, a user of the motor 20 can grasp a situation of the rotation unevenness of the motor 20 without preparing a dedicated meter or a measurement environment.

For example, if a result of measuring the rotation unevenness is set to be output to the outside, the rotation unevenness measured value Sw is made available at any time. Therefore, in comparison with a case in which the result is not output to the outside, an added value of a product can be enhanced.

To be specific, for example, when the rotation unevenness measured value Sw indicating that the rotation unevenness is great is output, it is possible to develop a device having added functions using the rotation unevenness measured value Sw, such as a function of determining that a replacement or maintenance time of the motor 20 arrives. Since the rotation unevenness measured value Sw can be always obtained during the driving, management and control of the rotation unevenness are possible, and an improvement in performance of the motor 20 can be promoted.

A function of outputting this result of measuring the rotation unevenness can be validly used as a determination reference when performance of a product is classified at a user side. For example, the motor 20 having small rotation unevenness can be classified as a high-grade machine, and the motor 20 having great rotation unevenness can be classified as a low-grade machine.

For example, when the motor 20 is used for an image forming device, operation modes may be classified with regard to a risk of causing color unevenness, and be operated according to this. For example, the motor 20 can be driven in each of operation modes such as a top-level printing mode in which the color unevenness is reduced by a driving method having small rotation unevenness, a typical printing mode in which the color unevenness is likely to be increased by a driving method without performing control of reducing the rotation unevenness, and so on. This is also similarly applied to a case in which the motor 20 is used for other types of devices.

After the rotation unevenness reducing circuit 52 or the rotation unevenness information memory 53 is provided, whether its operation itself or an output operation of information is made valid or invalid may be adapted to be switched. Thereby, the motor 20 can be driven according to wider use such as a case in which a configuration in which the gain information or the advance angle information is processed outside is adopted.

The motor 20 and the motor drive controller 1 may be provided in two ways as follows.

That is, as a first way, the rotation unevenness control information Sc (the constant of the optimum gain/optimum advance angle) may be adapted to be set in advance. For example, in evaluation and review processes, an optimum constant is output by the rotation unevenness information generator 5, and a motor designer manages the optimum constant. In a mass-production phase of the motor 20, optimum rotation unevenness control information Sc is set to be output to the control circuit 3, and a function of automatically setting the rotation unevenness of the rotation unevenness reducing circuit 52 is disabled. In this state, the motor 20 is consigned to a user. The user can use the motor 20 having small rotation unevenness using the motor 20 in which setting of the optimized constant is completed.

As a second way, the optimum constant may be adapted to be automatically set at normal times. In this case, the rotation unevenness reducing circuit 52 is adapted to automatically set the constant such that the rotation unevenness is extremely reduced on a condition which a user uses. In this state, the motor 20 and the motor drive controller 1 are consigned to the user. Thereby, when the user uses the motor 20, the optimum constant is automatically set.

The motor drive controller is not limited to the circuit configuration represented in the above embodiment and modifications. Various circuit configurations configured to fit for the purpose of the invention can be applied.

The rotation unevenness reducing circuit or the rotation unevenness information memory may not be provided. In this case, as described above, the rotation unevenness measured value that is the result of measuring the rotation unevenness may be adapted to be output to the outside of the motor drive controller, and the rotation unevenness control information generated based on this may be adapted to be input to the motor drive controller. The control circuit generates the driving control signal based on the rotation unevenness control information input from the outside. Thereby, as in the above embodiment, the driving control of the motor can be performed.

The method of driving the motor is not limited to typical sine wave drive, and may be a driving method based on a square wave, a driving method based on a trapezoid wave, a driving method in which special modulation is applied to a sine wave, or the like.

The aforementioned flowchart or the like is to show one example for describing the operation, and the invention is not limited thereto. The steps illustrated in each figure of the flowchart are specific examples, and are not limited to this flow. For example, another process may be inserted between the steps, and processes may be made parallel.

The motor driven by the motor drive controller of the present embodiment is not limited to the three-phase brushless motor, and may be other multiphase brushless motors. Moreover, a type of the motor is not particularly limited.

All or some of the processes in the above embodiment may be adapted to be performed by software or using a hardware circuit.

The embodiment can be considered to be illustrative rather than restrictive in all respects. The scope of the invention is defined not by the aforementioned description but by the scope of claims, and is intended to include all modifications within the meaning and the scope, which are equivalent to the scope of claims.

According to these aspects of the invention, the rotation unevenness indicating the flutter characteristic of the motor is measured based on the rotation status detection information, and the driving control signal is generated based on the information based on the rotation unevenness information. Accordingly, it is possible to provide a motor drive controller capable of measuring rotation unevenness value easily and performing rotation control with the rotation unevenness reduced, and a method for controlling a motor.

What is claimed is:

1. A motor drive controller comprising:
   a rotation status detector that detects a rotation status of a rotor of a motor and generates rotation status detection information corresponding to the detected rotation status;
   a rotation unevenness information generator that measures a rotation unevenness indicating a flutter characteristic of the motor based on the rotation status detection information and generates rotation unevenness information according to a result of measurement of the rotation unevenness;
   a control circuit that generates a driving control signal based on the rotation unevenness information and a target speed signal for controlling the motor to rotate in target speed corresponding to the target speed signal; and
   a motor driver that outputs a driving signal to the motor based on the driving control signal,
   wherein the rotation unevenness information generator includes:
      a rotation unevenness measuring circuit that measures the rotation unevenness based on the rotation status detection information and outputs the rotation unevenness information; and
      a rotation unevenness reducing circuit that generates rotation unevenness control information including gain information and advance angle information that are optimized to reduce the rotation unevenness based on the rotation unevenness information,
   wherein the rotation unevenness information generator is configured to output the rotation unevenness control information to at least one of the control circuit and an external device, and
   wherein the control circuit is configured to generate the driving control signal such that the rotation unevenness reducing information is included in the driving control signal based on the rotation unevenness control information when the rotation unevenness control information is input from the rotation unevenness information generator.

2. The motor drive controller according to claim 1, wherein the rotation unevenness information generator includes a rotation unevenness information memory in which the rotation unevenness information is stored.

3. The motor drive controller according to claim 1, wherein the rotation unevenness information generator includes a rotation unevenness information memory that stores at least one of the rotation unevenness information and the rotation unevenness control information.

4. The motor drive controller according to claim 1, wherein the rotation unevenness information generator is configured to output the rotation unevenness information to the external device.

5. The motor drive controller according to claim 1, wherein the rotation unevenness information generator is integrated with the control circuit.

6. A method for controlling a motor, the method comprising:
   detecting a rotation status of a rotor of the motor;
   generating rotation status detection information corresponding to the detected rotation status;
   measuring a rotation unevenness indicating a flutter characteristic of the motor by a rotation unevenness information generator based on the rotation status detection information;
   generating rotation unevenness information by the rotation unevenness information generator according to a result of measurement of the rotation unevenness;
   generating a driving control signal by a control circuit based on the rotation unevenness information and a target speed signal for controlling the motor to rotate in target speed corresponding to the target speed signal; and
   outputting a driving signal to the motor based on the driving control signal,
   wherein the rotation unevenness information generator includes:
      a rotation unevenness measuring circuit that measures the rotation unevenness based on the rotation status detection information and outputs the rotation unevenness information; and
      a rotation unevenness reducing circuit that generates rotation unevenness control information including gain information and advance angle information that are optimized to reduce the rotation unevenness based on the rotation unevenness information,
   wherein the rotation unevenness information generator is configured to output the rotation unevenness control information to at least one of the control circuit and an external device, and
   wherein the control circuit is configured to generate the driving control signal such that the rotation unevenness reducing information is included in the driving control signal based on the rotation unevenness control information when the rotation unevenness control information is input from the rotation unevenness information generator.

* * * * *